W. STEWART.
GLOBE VALVE.
APPLICATION FILED MAY 7, 1910.
1,024,751.
Patented Apr. 30, 1912.
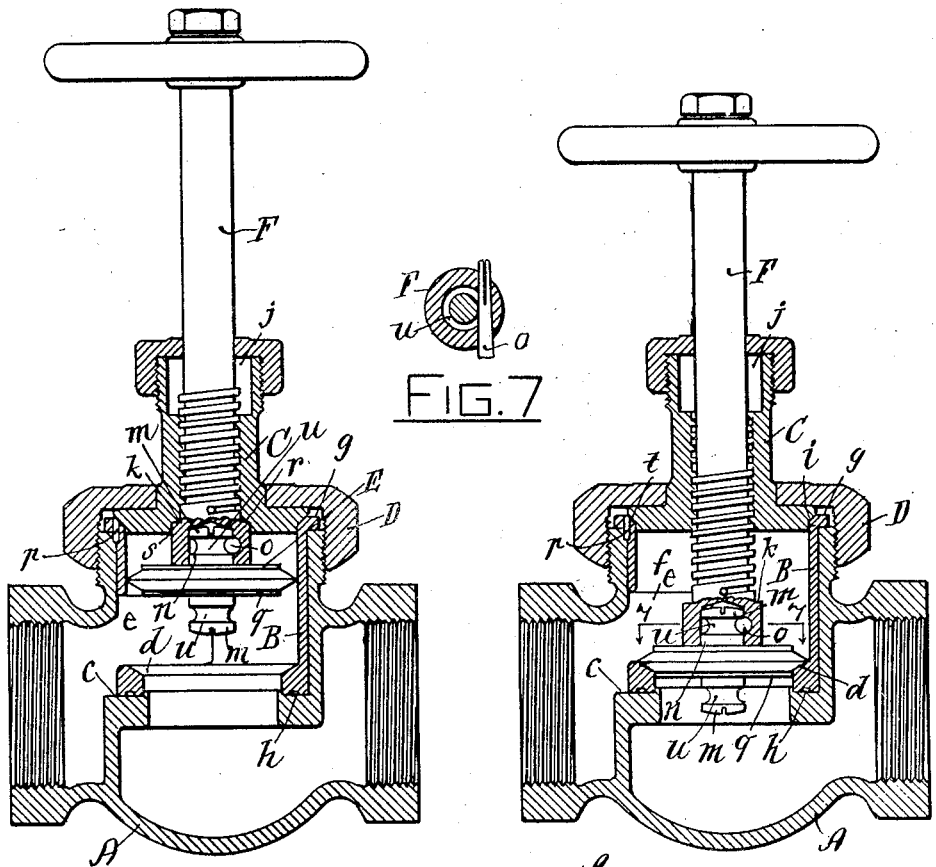
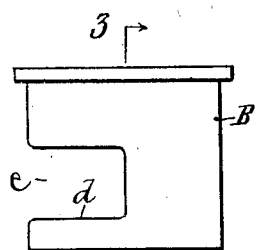
FIG.4
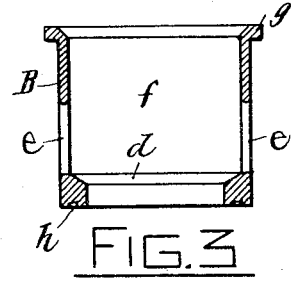
FIG.3
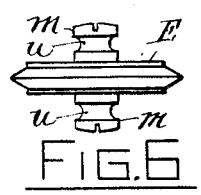
FIG.6
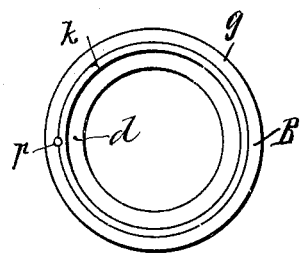
FIG.5
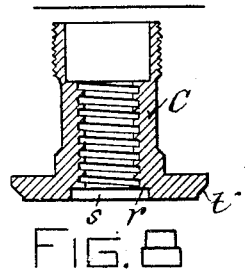
FIG.8
WITNESSES
Wallace E Parsons.
Chas. W. Eddy.
INVENTOR
William Stewart
per C. Scholfield
ATTORNEY

UNITED STATES PATENT OFFICE.

WILLIAM STEWART, OF PROVIDENCE, RHODE ISLAND, ASSIGNOR OF ONE-HALF TO JOSEPH J. SCHOLFIELD, OF PROVIDENCE, RHODE ISLAND.

GLOBE-VALVE.

1,024,751.  Specification of Letters Patent.  Patented Apr. 30, 1912.

Application filed May 7, 1910. Serial No. 560,059.

*To all whom it may concern:*

Be it known that I, WILLIAM STEWART, a citizen of the United States, and a resident of Providence, in the State of Rhode Island, have invented a new and useful Improvement in Globe-Valves, of which the following is a specification.

In globe valves as heretofore constructed, the valve seat is liable to become worn and leaky so as to require repairs that are often very difficult to accomplish. And it is the object of my invention to provide a means whereby ready access can be had to the valve seat under all circumstances for effecting such repairs and whereby the effect of the uneven expansion and contraction of the outer shell will be avoided, thus lessening the liability of wear to the valve. And my invention consists in the employment of a valve chamber member which is separate and distinct from the outer case; in the improved construction of the valve whereby it is automatically squared to its seat; and in the means whereby the valve spindle is caused to prevent the access of steam to the packing of the stuffing box when the valve is opened.

In the accompanying drawing:—Figure 1 represents an axial section of a globe valve embodying my improvement, the valve being shown at its completely opened position. Fig. 2 represents the same section showing the valve closed. Fig. 3 represents an axial section of the removable valve chamber member separate from the outer shell, taken in the line 3, 3, of Fig. 4. Fig. 4 represents a side view of the removable valve chamber member, showing the lateral opening therein for the outward passage of the fluid. Fig. 5 represents a top view of the said removable valve chamber member. Fig. 6 represents an edge view of a removable double faced valve, embodying my improvement. Fig. 7 represents a transverse section taken in the line 7, 7, of Fig. 2. Fig. 8 represents an axial section of the bonnet of the valve chamber member.

In the drawing, A represents the outer shell of a globe valve provided with an annular seat $c$, adapted to support the lower end of the valve chamber member B, the said valve chamber member being provided with the valve seat $d$, together with the lateral opening $e$ for the passage of the fluid from the valve chamber $f$, and with the external holding flange $g$. The said valve chamber member is also provided with the annular groove $h$ adapted to receive a gasket which serves to pack the joint between the lower end of the valve chamber member and the seat $c$ to prevent leakage. The valve chamber $f$ is closed by means of the bonnet C, having a seat $r$ in a recess $s$, and a beveled edge $t$ which bears against a corresponding beveled seat $i$ at the upper end of the valve chamber member B, the said bonnet C being held tightly to the said valve chamber member by means of the annular screw coupling D; and the upper end of the stem of the bonnet C is provided with a stuffing box $j$. The valve E is loosely attached to the lower end of the screw threaded valve spindle F, the said valve spindle being provided with an annular shoulder $k$ adapted when raised to its highest position to bear against the annular seat $r$, of the bonnet C in the recess $s$, as shown in Fig. 1. The valve E is provided with a circumferentially grooved stem $m$ which fits loosely within the recess $n$, at the end of the valve spindle F, being held therein by means of the tangentially arranged holding pin $o$, which enters the groove $u$, as shown in Fig. 7, and is also provided with the circumferential shoulder $q$ which serves to guide the loosely connected valve squarely to its seat. The valve E is preferably made so as to be adapted for reversal as shown in Fig. 6. The bonnet C and the valve chamber member B are prevented from being turned relatively to the outer shell A, by means of the locking pin $p$.

I claim as my invention:

In a globe valve, the combination of the outer shell provided with flat upper and lower annular seats, with a removable valve chamber member resting upon the said upper and lower seats, and provided with an opening at one side for the outward passage of the fluid from the valve chamber, and also with an interior beveled seat, a bonnet provided with a beveled seat fitting the said interior seat of the valve chamber member, and with an internal screw thread, a valve spindle fitting the said screw thread of the bonnet, and provided with a recess at its end, with a valve having a stem provided with a circumferential groove, and loosely held in the said recess, by means of the said groove.

WILLIAM STEWART.

Witnesses:
 SOCRATES SCHOLFIELD,
 BENJAMIN L. DENNIS.